United States Patent
Braun et al.

(10) Patent No.: US 7,355,648 B1
(45) Date of Patent: Apr. 8, 2008

(54) CAMERA HAVING A THROUGH THE LENS PIXEL ILLUMINATOR

(75) Inventors: Ori J. Braun, Palo Alto, CA (US); Giora Yahav, Haifa (IL)

(73) Assignee: 3DV Systems Ltd., Yokneam Ilit (IL)

( * ) Notice: Subject to any disclaimer, the term of this patent is extended or adjusted under 35 U.S.C. 154(b) by 791 days.

(21) Appl. No.: 10/332,643

(22) PCT Filed: Jul. 9, 2000

(86) PCT No.: PCT/IL00/00404

§ 371 (c)(1),
(2), (4) Date: Jun. 9, 2003

(87) PCT Pub. No.: WO02/05549

PCT Pub. Date: Jan. 17, 2002

Related U.S. Application Data

(63) Continuation-in-part of application No. 09/250,322, filed on Feb. 16, 1999, now Pat. No. 6,445,884.

(51) Int. Cl.
*H04N 5/222* (2006.01)
*G03B 15/02* (2006.01)

(52) U.S. Cl. ......................... 348/370; 396/61
(58) Field of Classification Search ........ 348/370–372, 348/136, 143, 152, 61, 135, 169, 268–271; 396/61, 106, 109, 164, 100, 182; 382/103; 362/11, 276, 464–466
See application file for complete search history.

(56) References Cited

U.S. PATENT DOCUMENTS

| | | | |
|---|---|---|---|
| 3,571,493 A | 3/1971 | Baker et al. | |
| 3,629,796 A | 12/1971 | Brownscombe et al. | |
| 3,634,725 A | 1/1972 | Biber | |
| 3,734,625 A | 5/1973 | Aagard | |
| 3,834,816 A | 9/1974 | Pedinoff | |
| 4,143,263 A | 3/1979 | Eichweber | |
| 4,185,191 A | 1/1980 | Stauffer | |

(Continued)

FOREIGN PATENT DOCUMENTS

DE 40 26 956 3/1992

(Continued)

OTHER PUBLICATIONS

Clark, V.; "Large Area Array with Non-Linear Active Current Mode Pixels"; talks given at 1996 SSCTC Workshop on CMOS Imaging Technology.

(Continued)

*Primary Examiner*—Tuan Ho
*Assistant Examiner*—Tuan Le

(57) ABSTRACT

A camera comprising: a photosurface comprising light sensitive pixels that generate signals responsive to light incident thereon and optics that focus an image of a scene onto the photosurface; and an illumination system for illuminating the scene, the illumination system comprising: an illuminator having a plurality of substantially contiguous, independently controllable light providing regions; optics that focuses an image or the illuminator on the scene so that light from the illuminator illuminates substantially all of and substantially only the field of view of the camera; and a controller that controls light provided by each light providing region.

60 Claims, 4 Drawing Sheets

U.S. PATENT DOCUMENTS

| | | | |
|---|---|---|---|
| 4,408,263 A | 10/1983 | Sternlicht | |
| 4,410,804 A | 10/1983 | Stauffer | |
| 4,477,184 A | 10/1984 | Endo | |
| 4,501,961 A | 2/1985 | Stauffer | |
| 4,591,918 A | 5/1986 | Hisano | |
| 4,680,579 A | 7/1987 | Ott | |
| 4,687,326 A | 8/1987 | Corby | |
| 4,734,733 A | 3/1988 | Clapp et al. | |
| 4,734,735 A | 3/1988 | Haneda | |
| 4,769,700 A | 9/1988 | Pryor | |
| 4,780,732 A | 10/1988 | Abramov | |
| 4,916,324 A | 4/1990 | Meier | |
| 4,935,616 A | 6/1990 | Scott | |
| 4,959,726 A | 9/1990 | Miida et al. | |
| 4,971,413 A | 11/1990 | Inoue | |
| 4,985,816 A | 1/1991 | Seko et al. | |
| 4,991,953 A | 2/1991 | Pflibsen et al. | |
| 5,009,502 A | 4/1991 | Shih et al. | |
| 5,056,914 A | 10/1991 | Kollodge | |
| 5,081,530 A | 1/1992 | Medina | |
| 5,090,803 A | 2/1992 | Ames et al. | |
| 5,110,203 A | 5/1992 | MacCabee | |
| 5,157,451 A | 10/1992 | Taboada et al. | |
| 5,198,877 A | 3/1993 | Schulz | |
| 5,200,793 A | 4/1993 | Ulich et al. | |
| 5,200,931 A | 4/1993 | Kosalos et al. | |
| 5,216,259 A | 6/1993 | Stern et al. | |
| 5,218,485 A | 6/1993 | Malm | |
| 5,220,164 A | 6/1993 | Lieber et al. | |
| 5,225,882 A | 7/1993 | Hosokawa et al. | |
| 5,243,553 A | 9/1993 | Flockencier | |
| 5,253,033 A | 10/1993 | Lipchak et al. | |
| 5,255,087 A | 10/1993 | Nakamura et al. | |
| 5,265,327 A | 11/1993 | Faris et al. | |
| 5,283,671 A * | 2/1994 | Stewart et al. | 358/532 |
| 5,307,200 A | 4/1994 | Yoshida | |
| 5,334,848 A | 8/1994 | Grimm | |
| 5,343,391 A | 8/1994 | Mushabac | |
| 5,345,266 A | 9/1994 | Denyer | |
| 5,351,677 A | 10/1994 | Kami et al. | |
| 5,408,263 A | 4/1995 | Kikuchi et al. | |
| 5,434,612 A | 7/1995 | Nettleton et al. | |
| 5,448,330 A | 9/1995 | Takagi | |
| 5,455,451 A | 10/1995 | Usagawa et al. | |
| 5,499,168 A | 3/1996 | Cochard et al. | |
| 5,587,832 A | 12/1996 | Krause | |
| 5,828,485 A | 10/1998 | Hewlett | |
| 5,844,588 A | 12/1998 | Anderson | |
| 5,938,319 A | 8/1999 | Hege | |
| 5,969,754 A | 10/1999 | Zeman | |
| 6,023,365 A | 2/2000 | McDonald | |
| 6,057,909 A * | 5/2000 | Yahav et al. | 356/5.04 |
| 6,091,905 A | 7/2000 | Yahav et al. | |
| 6,100,517 A | 8/2000 | Yahav et al. | |
| 6,379,022 B1 * | 4/2002 | Amerson et al. | 362/231 |
| 6,445,884 B1 | 9/2002 | Yahav | |
| 6,654,556 B2 | 11/2003 | Braun et al. | |
| 6,941,323 B1 * | 9/2005 | Galperin | 707/104.1 |
| 2001/0055482 A1 | 12/2001 | Braun et al. | |
| 2002/0015103 A1 | 2/2002 | Shi | |
| 2002/0112005 A1 * | 8/2002 | Namias | 709/206 |

FOREIGN PATENT DOCUMENTS

| | | |
|---|---|---|
| DE | 44 20 637 | 12/1995 |
| EP | 0 313 518 | 4/1989 |
| EP | 0 436 267 | 7/1991 |
| EP | 0449337 | 10/1991 |
| EP | 0 465 806 | 1/1992 |
| EP | 0 474 264 | 3/1992 |
| EP | 0835460 | 4/1998 |
| EP | 0886790 | 12/1998 |
| EP | 1 006 386 | 6/2000 |
| FR | 2 713 165 | 6/1995 |
| JP | 57-193183 | 11/1982 |
| JP | 01-100492 | 4/1989 |
| JP | 02-211782 | 8/1990 |
| JP | 03-258200 | 11/1991 |
| JP | 04-301784 | 10/1992 |
| JP | 07-110381 | 4/1995 |
| WO | WO 89/12837 | 12/1989 |
| WO | WO 97/01111 * | 1/1997 |
| WO | WO 97/01112 | 1/1997 |
| WO | WO 97/01113 | 1/1997 |
| WO | WO 98/26583 | 6/1998 |
| WO | WO 00/19705 | 4/2000 |
| WO | WO 00/36372 | 6/2000 |
| WO | WO 01/01038 | 1/2001 |
| WO | WO 01/18563 | 3/2001 |
| WO | WO 02/04247 | 1/2002 |
| WO | WO 02/49366 | 6/2002 |

OTHER PUBLICATIONS

Vietze, O. et al.; "Image Sensing with Programmable Offset Pixels for Increased Dynamic Range of More Than 150 dB"; SPIE, vol. 2654; pp. 93-98.

Delong, M. L. et al.; "Underwater Laser Imaging System;" Apr. 1995; Proceeding of the Autonomous Vehicles in Mine Countermeasures Symposium; pp. 6-103 through 6-111.

Anthes, J. P. et al.; "Non-scanned LADAR imaging and applications;" 1993; SPIE; vol. 1936; pp. 11-22.

Hill, L. S. et al.; "A Multi-Detecting Rangefinder Capable of Range Imaging;" Sep. 1994; Applied Optics and Optoelectronics; University of York; Abstract Book; pp. 208-210.

Burns et al.; "Compact, 625-Chanel Scannerless Imaging Laser Radar Receiver;" SPIE; vol. 2748; pp. 39-46; Conference date Apr. 10, 1995; Abstract in 1995.

Strand, M. P.; "Underwater Electro-optical System for Mine Identification;" Proceedings of the Autonomous Vehicles in Mine Countermeasures Symposium; pp. 6-238 through 6-247.

Garcia, P. et al.; "Characterization of a Scannerless LADAR System;" 1993; SPIE; vol. 1936; pp. 23-30.

Muguira, M. R. et al.; "Scannerless Range Imaging with a Square Wave;" SPIE; vol. 2472; pp. 106-113; Conference date Apr. 1995.

Swartz, B. A.; "Diver and ROV Deployable Laser Range Gate Underwater Imaging Systems;" 1993; Underwater Intervention '93; Conference Proceedings; pp. 193-199.

Christie, S. et al.; "Design and Development of a Multi-Detecting Two-Dimensional Ranging Sensor;" Sep. 1995; Measurement Science & Technology; vol. 6; No. 9; pp. 1301-1308.

Sackos, J. et al.; "The Emerging Versatility of Scannerless Range Imager"; SPIE; vol. 2748; pp. 47-60; Conference was in Apr. 1996.

Kawakita, M. et al; "Axi-Vision Camera: A Three-Dimension Camera"; 2000; Proceedings of the SPIE; pp. 61-70; XP000987367.

Schwarte, R. et al.; "A New Electrooptical Mixing and Correlating Sensor: Facilities and Application of the Photonic Mixer Device (PMD);" SPIE; vol. 3100; pp. 245-253.

"Intensified Less System"; Commercial Publication by Imco Electro-optics Ltd.; Essex; UK.

* cited by examiner

CAMERA HAVING A THROUGH THE LENS PIXEL ILLUMINATOR

RELATED APPLICATIONS

The present application is a US national application of PCT Application No. PCT/IL00/00404, filed on Jul. 9, 2000. This application is also a continuation-in-part of U.S. application Ser. No. 09/250,322, filed on Feb. 16, 1999, now U.S. Pat. No. 6,445,884.

FIELD OF THE INVENTION

The present invention relates to imaging a scene with light and in particular to methods and apparatus for illuminating the imaged scene.

BACKGROUND OF THE INVENTION

Satisfactory and effective imaging of a scene with light requires proper illumination of the scene. In many instances however, achieving proper illumination is a relatively complicated and arduous task. Often it is desirable and/or necessary to illuminate different regions of a scene with different intensity and/or color light. Sometimes a dynamic range of a camera limits contrast in an image of a scene and brightest regions and dimmest regions of the scene cannot be properly imaged at the same time. Sometimes lighting and color of illumination must be adjusted to provide desired effects in an image.

For example, in imaging a product for a catalogue, lighting usually has to be adjusted to increase illumination of certain regions of the product while decreasing illumination of other regions of the product. To enhance images of the product so that they are appropriately flattering, color of light used to illuminate the product may have to be adjusted and substantial effort invested in arranging direction and intensity of indirect lighting of the product.

In imaging items for visual inspection, lighting generally has to be adjusted to assure that inspected features of the items are appropriately visible to enable proper inspection. Often, to distinguish features of an inspected item, color of light illuminating a first region of the item is optionally adjusted to be different from color of light illuminating a second region of the item.

In some applications it may be desirable to adjust illumination of a scene so that light reaching a camera from all regions of the scene has substantially a same intensity or that intensities from different regions in the scene vary within a relatively narrow intensity range. For example, PCT Publications WO97/01111, WO97/01112, and WO97/01113 the disclosures of which are incorporated herein by reference describe gated 3D cameras that measures distances to regions in a scene. In a described 3D camera, a train of light pulses is radiated by a light source to illuminate the scene. Following each light pulse the camera is gated open to receive light reflected by regions in the scene from the light pulse and image the received light on a photosurface comprised in the camera. Distance to a region is determined from timing of the gates with respect to emission times of the light pulses and a total amount of light from the region that is received and imaged during the gates.

In some instances, differences in reflectivity of different regions of the scene and/or differences in distances of different region in the scene from the camera result in substantial differences in intensity of reflected light reaching the camera. For example, intensity of light received from a region in a scene is a function of a solid angle subtended by the region at the camera. Since the solid angle is inversely proportional to the square of the distance from the camera, small differences in distances from the camera of regions in the scene can generate large differences in intensity of light reaching the camera from the regions. The range of these intensity differences can sometimes approach or exceed the dynamic range of the camera. As a result, accuracy of determination of distances to regions in the scene can vary substantially. In some instances, as a result of intensity differences it may not be possible to determine distances to all regions of the scene at a same time.

SUMMARY OF THE INVENTION

An aspect of some embodiments of the present invention relates to providing a camera, comprising an improved illumination system for illuminating a scene imaged with the camera. The illumination system illuminates regions of the scene that are imaged on contiguous regions of the photosurface independently of each other. Hereinafter, regions of a scene that are independently illuminated in accordance with an embodiment of the present invention are referred to as "illumination zones".

According to an aspect of some embodiments of the present invention the size of an illumination zone is such that the illumination zone is imaged on a single pixel of the photosurface.

According to an aspect of some embodiments of the present invention the size of an illumination zone is such that the illumination zone is imaged on a group of pixels on the photo surface.

In some embodiments of the present invention all illumination zones of a scene are imaged regions of the photosurface having a same size and shape. In some embodiments of the present invention different illumination zones are imaged on different size and/or shape regions of the photosurface.

An aspect of some embodiments of the present invention relates to adjusting intensity of light that illuminates each illumination zone of a scene independently of other illumination zones in the scene.

An aspect of some embodiments of the present invention relates to adjusting color of light that illuminates each illumination zone of a scene independently of other illumination zones in the scene.

A camera in accordance with an embodiment of the present invention comprises a photosurface on which light from a scene imaged with the camera is focused and an illumination system having a spatially modulated light source boresighted with the photosurface. The light source, hereinafter referred to as a "pixelated illuminator", comprises a plurality of independently controllable light providing regions, hereinafter referred to as "luxels". The size, location and orientation of the pixelated illuminator and optics used to boresight the pixelated illuminator with the photosurface are such that a virtual image of the pixelated illuminator is substantially coincident with the photosurface. A virtual image of each luxel of the pixelated illuminator is therefore located in a different corresponding region of the photosurface and light from virtual images of any two luxels does not appear to pass through or emanate from a same region of the photosurface. In an embodiment of the invention, the pixelated illuminator is boresighted with the photosurface using methods and devices described in U.S. patent application Ser. No. 09/250,322, the disclosure of which is incorporated herein by reference.

The region of the photosurface on which a virtual image of a luxel is located images a region of the scene that is an illumination zone of the scene corresponding to the luxel. Light from the luxel illuminates only the illumination zone that is imaged on the region of the photosurface in which the virtual image of the luxel is located.

In some embodiments of the present invention, the camera comprises a controller that controls intensity of light provided by a luxel so as to control intensity of illumination of the illumination zone corresponding to the luxel. In some embodiments of the present invention the controller controls the luxel to adjust hue and/or saturation of light illuminating the illumination zone.

According to an aspect of some embodiments of the present invention, the controller receives signals generated by a pixel or pixels of the photosurface on which an illumination zone of a scene is imaged responsive to light incident on the pixel or pixels from the illumination zone. The controller controls light provided by the luxel that illuminates the illumination zone, responsive to the received signals. According to an aspect of some embodiments of the present invention the controller receives instructions from a user that define a desired hue, and/or saturation and/or intensity for light reaching the pixel or pixels of the photosurface from the illumination zone. The controller controls light provided by the luxel responsive to the instructions so that light that reaches the pixel or pixels has the desired characteristics defined by the user.

For example, assume a person uses a camera in accordance with an embodiment of the present invention to image a metal object that has highly reflecting areas. The person might prefer to reduce light reaching the camera from the highly reflecting areas to reduce glare and improve perceived quality of the image of the object. In accordance with an embodiment of the present invention, the person can accomplish this by instructing the controller to reduce, by a desired amount, intensity of illumination of illumination zones corresponding to pixels in the image that register light intensity greater than a maximum light intensity defined by the person. In some embodiments of the present invention the person can accomplish this by indicating on a display of a preview of the image, a region or regions for which the user wants to reduce brightness. After indicating the region or regions, in some embodiments, the user may indicate an amount by which the user wishes to reduce illumination of the region or regions on an appropriate control panel that is displayed with the preview. After the controller reduces illumination of illumination zones corresponding to the indicated region or regions, a new preview may be presented to the user, which if the user desires he or she can adjust again.

In some embodiments of the present invention hue and saturation of light illuminating a scene being imaged using the camera are adjusted similarly. For example, assuming the pixelated illuminator illuminates illumination zones with R, G or B light, the user can adjust color of the image by adjusting intensity, using for example methods similar to those described above, of R, G and/or B light illuminating illumination zones of the scene.

In some embodiments of the present invention, the virtual image of a luxel on the photosurface is substantially coincident with a single pixel on the photosurface. The luxel therefore illuminates a region, i.e. an illumination zone, of a scene imaged on the photosurface that is imaged on the single pixel on the photosurface. In some embodiments of the present invention, the virtual image of a luxel is substantiality coincident with a group of pixels on the photosurface and the luxel illuminates an illumination zone of a scene that is imaged on the group of pixels. In some embodiments of the present invention luxels are not all the same size and/or shape and two different luxels may illuminate different size and/or shape illumination zones in a scene. In some embodiments of the present invention virtual images of luxels on the photosurface are smaller than a pixel on the photosurface and a plurality of virtual images of luxels are located within a single pixel of the photosurface.

In some embodiments of the present invention, a camera comprises an illumination system having a pixelated illuminator that is not boresighted with a photosurface of the camera. Instead, the illumination system comprises its own optics that focuses light from the pixelated illuminator on a scene being imaged by the camera. The camera may comprise a controller that controls the illumination system optics so that the light from the pixelated illuminator is focused to the scene being imaged by the camera.

Light providing systems and devices suitable for use as a pixelated illuminator for practice of the present invention are available in the market. In particular, certain types of light projectors used for projection display of images are suitable for use in practice of the present invention. These light projectors comprise luxels that are independently controllable to provide light at desired intensities and colors. The luxels can be made as small as pixels in a typical CCD or CMOS camera.

U.S. Pat. No. 4,680,579 to E. O. Granville, the disclosure of which is incorporated herein by reference, describes a light projector that uses a digital mirror device (MD) in which micro mirrors function as luxels and reflect light of desired intensity and color provided by a suitable light source. U.S. Pat. No. 5,844,588 to Anderson, the disclosure of which is incorporated herein by reference, describes a DMD device used in an illumination system for a xerographic printer. Texas Instruments markets DMD light projectors and image projection systems based on DMDs. JVC markets a D-ILA (Direct, Direct Drive or Digital, Image Light Amplifier) light projector and image projection systems in which liquid crystal (LC) pixels are controlled to project light of desired intensity and color. Various projection light sources are described in a technical article entitled "Display Technologies" available during April 2000 from URL sight "www.extron.com", the disclosure of which is incorporated herein by reference.

An aspect of some embodiments of the invention is concerned with the acquisition of high gray level resolution images utilizing a camera having a lower gray level resolution.

In an exemplary embodiment of the invention, a first image of a scene is acquired utilizing uniform lighting. The lighting, which can be controlled to controllably and differently illuminate the various regions of the field of view is adjusted to give a relatively flat (contrast-wise) image. If the acquisition has a resolution of N gray levels (from zero to some maximum) the illumination may have up to N' illuminations spaced at intervals such that for each gray level there exists a combination of N and N' such that $N*N'=C$, where C is a constant that is the same for all of the pixels. Thus, if the illumination is matched to intensity measured on the initial image acquisition, and a second image is acquired, the intensity variations are less than ±0.5 of the intensity distance between the initial gray levels. However, in an exemplary embodiment of the invention, the acquisition range is set to cover this range of gray levels with substantially the entire scan of acquisition levels.

If M acquisition levels and P illumination levels are available, each pixel (i, j) is characterized by two numbers $m_{ij}$ and $p_{ij}$. The gray levels of a uniformly illuminated image can thus be derived to a resolution given by M×P gray levels.

In some embodiments of the invention, the illumination is controlled only over regions of greater than one pixel. In this case, the second image will have a variability that is larger than the variability when the illumination of the individual pixels are separately illuminated. In one exemplary embodiment, the field of view is divided into Q regions. An uniformly lit image is acquired. The acquired intensity over the regions is averaged and the illumination is adjusted such that the acquired intensity (for a subsequent image) over all of the regions (based on the averages) is uniform to within the quantization accuracies of the illumination and the acquisition. Again, each pixel is characterized by two numbers, one for the illumination and one for the acquisition.

The number of levels for illumination and acquisition need not be the same. Thus, for example, if there are half as many illumination levels as there are acquisition levels, the illumination levels are matched to every second acquisition level, such that the total range of illuminations for the second acquisition is ±1 original gray level. The second acquisition is set to cover this range with the entire range of acquisition values.

A very high resolution gray level (uniformly illuminated) image can be constructed utilizing these embodiments by generating an image in which each pixel has a brightness derived from the illumination level and the acquired brightness level. Thus, the first P bits of the image gray level would be given by the illumination values and the next M bits of the image gray level would be given by the acquisition levels of the second acquired image. Conveniently, two matrices are provided, one of which contains information on the illumination and the other information on the second acquisition.

While a fixed A/D for the acquisition may be used, in some embodiments of the invention an A/D that allows for adjusting the zero level for the acquisition (so that the acquisition starts at the gray level of the pixel with the lowest illumination) and the A/D gain, so that the highest acquisition gray level is matched with the brightest portion of the image. An iris may be provided to at least partially adjust the gain.

The above discussion describes a system in which the illumination elements illuminate pixels or groups of pixels without overlap. In general, illumination of a pixel (for individual pixel illumination) or illumination of a region (for regional pixel illumination) will overlap at least partly into one or more neighboring pixels. In such cases, the reconstruction optionally takes into account the effects of illumination of adjacent pixels when determining the illumination to be used and in reconstructing the image. Optimally, for regional illumination, the overlap is adjusted such that, for uniform brightness of the sources, each pixel is uniformly illuminated. This can be achieved, for example, by providing for Gaussian roll off of the illumination, with the half illumination point at the edge of the portion being illuminated.

There is therefore provided in accordance with an embodiment of the present invention a camera comprising: a photosurface comprising light sensitive pixels that generate signals responsive to light incident thereon and optics that focus an image of a scene onto the photosurface; and an illumination system for illuminating the scene, the illumination system comprising: an illuminator having a plurality of substantially contiguous, independently controllable light providing regions; optics that focuses an image of the illuminator on the scene so that light from the illuminator illuminates substantially all of and substantially only the field of view of the camera; and a controller that controls light provided by each light providing region.

Optionally, the illuminator is boresighted with the photosurface so that a virtual image of the illuminator is located at the photosurface and optics that image the scene on the photosurface image the illuminator on the scene. Optimally, a virtual image of the illuminator is substantially coincident with the photosurface.

In some embodiments of the present invention light from each of the light providing regions that is reflected from the scene is imaged on a different group of contiguous pixels in the photosurface.

In some embodiments of the present invention light from each of the light providing regions that is reflected from the scene and imaged by the camera is imaged on a region of the photosurface having a size substantially equal to the size of a pixel in the photosurface. In an embodiment of the invention, the region on which the light is imaged is located substantially within the area of a pixel on the photosurface.

In some embodiments of the present invention the regions of the photosurface on which light from at least two adjacent light providing regions of the illuminator is imaged overlap.

In some embodiments of the present invention there is substantially little overlap of regions of the photosurface on which light from adjacent light providing regions of the illuminator is imaged.

In some embodiments of the present invention light from a plurality of the light providing regions that is reflected from the scene and imaged by the camera is imaged on a same region of the photosurface having a size substantially equal to the size of a pixel in the photosurface. Optimally, the region on which the light from the plurality of light providing regions is imaged is located substantially within the area of a pixel on the photosurface.

In some embodiments of the present invention all light providing regions provide light characterized by a substantially same spectrum. Optionally, each light providing region provides white light.

In some embodiments of the present invention each light providing region is controllable to provide light in at least two different wavelength bands of light. In an exemplary embodiment, each light providing region is controllable to provide R, G and B light.

In some embodiments of the present invention the plurality of light providing regions comprises three light providing regions. In an exemplary embodiment, each light providing region provides a different one of R, G or B light.

In some embodiments of the present invention the controller controls intensity of R, G or B light provided by each light providing region so as to control hue, saturation or intensity of light illuminating a region of the scene which is illuminated by light from the light providing region independently of hue saturation and intensity of light illuminating other regions of the scene.

In some embodiments of the present invention the controller controls light provided by at least one light providing region to control an intensity distribution of R, G or B light reflected by the scene that is incident on pixels of the photosurface.

In some embodiments of the present invention the controller controls intensity of light provided by each light providing region so as to control intensity of light illuminating a region of the scene illuminated by light from the light providing region independently of intensity of light illuminating other regions of the scene.

In some embodiments of the present invention the controller controls light provided by at least one light providing region to control an intensity distribution of light reflected by the scene that is incident on pixels of the photosurface.

In some embodiments of the present invention the controller receives signals generated by each pixel responsive to light incident on the pixel and controls light provided by at least one of the light providing regions responsive to the signals to adjust illumination of the scene.

Optionally, the controller controls light provided by at least one light providing region to decrease intensity of light reaching the camera from a region of the scene for which intensity of light incident on a pixel that images the region is greater than a predetermined maximum intensity. Alternatively or additionally, the controller controls light provided by at least one light providing region to increase intensity of light reaching the camera from a region of the scene for which intensity of light incident on a pixel that images the region is less than a predetermined minimum intensity.

In some embodiments of the present invention the camera comprises a user operated input terminal to transmit instructions to the controller and wherein the controller controls light from at least one of the light providing regions responsive to the instructions to adjust illumination of the scene. Optionally, the input terminal comprises a display screen. Optionally, the controller generates a preview of an image of the scene being imaged by the camera on the screen. responsive to signals that it receives from the pixels. Optionally, the screen is a touch sensitive screen on which a border can be delineated surrounding an object or region in the preview of the scene to select the object or region by touching the screen. Alternatively or additionally the camera comprises a pointer controllable to select an object or region in the preview. In some embodiments of the present invention the controller controls light provided by light providing regions responsive to the selected region or object.

In some embodiments of the present invention the controller displays a control panel having control icons on the screen and wherein manipulation of the control icons transmits instructions to the controller.

In some embodiments of the present invention the camera comprises a shutter that the controller opens and closes to gate the photosurface on and off. In some embodiments of the present invention pixels in the photosurface are controllable to be gated on and off and wherein the controller gates the photosurface on and off by gating the pixels.

Alternatively or additionally the controller may simultaneously turn on and turn off light providing regions so as to radiate at least one pulse of light having a pulse width that illuminates the scene. Optionally, the controller gates the photosurface on and off at times responsive to a time at which the at least one light pulse is radiated. Optionally, the controller gates the photosurface off when the illumination system is providing light to illuminate the scene.

Alternatively or additionally the at least one light pulse comprises a train of light pulses. Optionally, the controller gates the photosurface on for a first gate period after a first time lapse following each radiated light pulse of a first plurality of radiated light pulses in the train of light pulses; and gates the photosurface on for a second gate period after a second time lapse following each radiated light pulse of a second plurality of radiated light pulses. Optimally, the mid points of first and second gate periods are delayed with respect to the radiated light pulses that they respectively follow by the same amount of time. Optionally, the duration of the first gate is greater than or equal to three times the pulse width. Optionally, the duration of the second gate period is substantially equal to the pulse width of the radiated light pulses. Generally, the controller determines intensity of light reaching the camera from a region of the scene from an amount of light incident on a pixel that images the region. Optimally, the controller controls light provided by the light providing regions so as to minimize a difference between a predetermined light intensity and intensity of light reaching each pixel in the photosurface from the scene. The controller may determine a distance to region of the scene imaged on a pixel of the photosurface responsive to amounts of light incident on the pixel during the first and second gates.

In some embodiments of the present invention the light providing regions are light sources that emit light. Each light providing region comprises a laser. Alternatively, each light providing region comprises a light emitting diode.

In some embodiments of the present invention the camera comprises a light source and wherein the light providing regions provide light by reflecting and modulating light from the light source that is incident on the light providing regions. In an embodiment of the invention, each light providing region comprises a micromirror controllable to reflect light in a direction towards the optics that focuses an image of the illuminator on the scene. Alternatively each light providing region may comprises a liquid crystal having a controllable transmittance and a mirror and wherein light from the light source enters the liquid crystal and is reflected back out the liquid crystal cells by the mirror in a direction towards the optics that focuses an image of the illuminator on the scene.

There is further provided, in accordance with an embodiment of the present invention a method for illuminating a scene being imaged by a camera, the camera comprising a photosurface having pixels and optics for imaging the scene on the photosurface, the method comprising: illuminating the scene with an illuminator comprising a plurality of light providers so that each region of the scene that is imaged on a region of the photosurface comprising at least one pixel but less than all the pixels of the photosurface is illuminated with light provided by at least one light provider that provides light substantially only for the region; and controlling light provided the at least one light provider for a region of the scene to adjust illumination of the scene. The at least one pixel may a single pixel.

In some embodiments of the present invention the method comprises boresighting the illuminator so that a virtual image of the illuminator is located substantially at the photosurface.

Optimally, the virtual image of the illuminator is substantially coincident with the photosurface. In some embodiments of the present invention a virtual image of each light provider is located within a different group of contiguous pixels on the photosurface. In some embodiments of the present invention a virtual image of each light provider is located substantially within a corresponding single pixel. In some embodiments of the present invention a virtual image of a plurality of light providers is located substantially within a corresponding single pixel.

In some embodiments of the present invention the light providers are independently controllable and wherein controlling each of the light providing regions comprises controlling each of the light providing regions independently of the other light providing regions.

In some embodiments of the present invention controlling light comprises controlling the light to control contrast in an image of the scene provided by the camera. In some embodiments of the present invention controlling contrast comprises controlling contrast in only a localized region of the image.

In some embodiments of the present invention controlling light comprises controlling the light to adjust an intensity distribution of light from the scene that is incident on pixels in the photosurface. Optionally, adjusting an intensity distribution comprises controlling a parameter of the intensity distribution.

In some embodiments of the present invention controlling light comprises controlling the light to perform a predetermined image processing procedure.

In some embodiments of the present invention the image processing procedure comprises unsharp masking. In some embodiments of the present invention the image processing procedure comprises sharpening. In some embodiments of the present invention the image processing procedure comprises smoothing. In some embodiments of the present invention the image processing procedure comprises histogramic equalization.

There is further provided, in accordance with an embodiment of the invention, a method of imaging, comprising:

illuminating at least a portion of a scene with substantially uniform lighting;

determining a spatially varying illumination that reduces the variability of brightness values of the at least portion of the scene;

illuminating the at least portion with said varying illumination;

acquiring a second image of the at least portion, said second image having brightness values for areas thereof; and determining the brightness values of the scene under uniform illumination from the brightness values and the varying values of the illumination.

Optionally, illuminating comprises illuminating utilizing the method of any of claims 50-57.

In an embodiment of the invention, acquiring the second image comprises acquiring the images using a brightness acquisition range limited to the range of brightness values in the image.

BRIEF DESCRIPTION OF FIGURES

The following description describes examples of embodiments of the present invention and should be read with reference to figures attached hereto. In the figures, identical structures, elements or parts that appear in more than one figure are generally labeled with the same numeral in all the figures in which they appear. Dimensions of components and features shown in the figures are chosen for convenience and clarity of presentation and are not necessarily shown to scale. The figures are listed below.

DETAILED DESCRIPTION OF EMBODIMENTS

Figure 1:
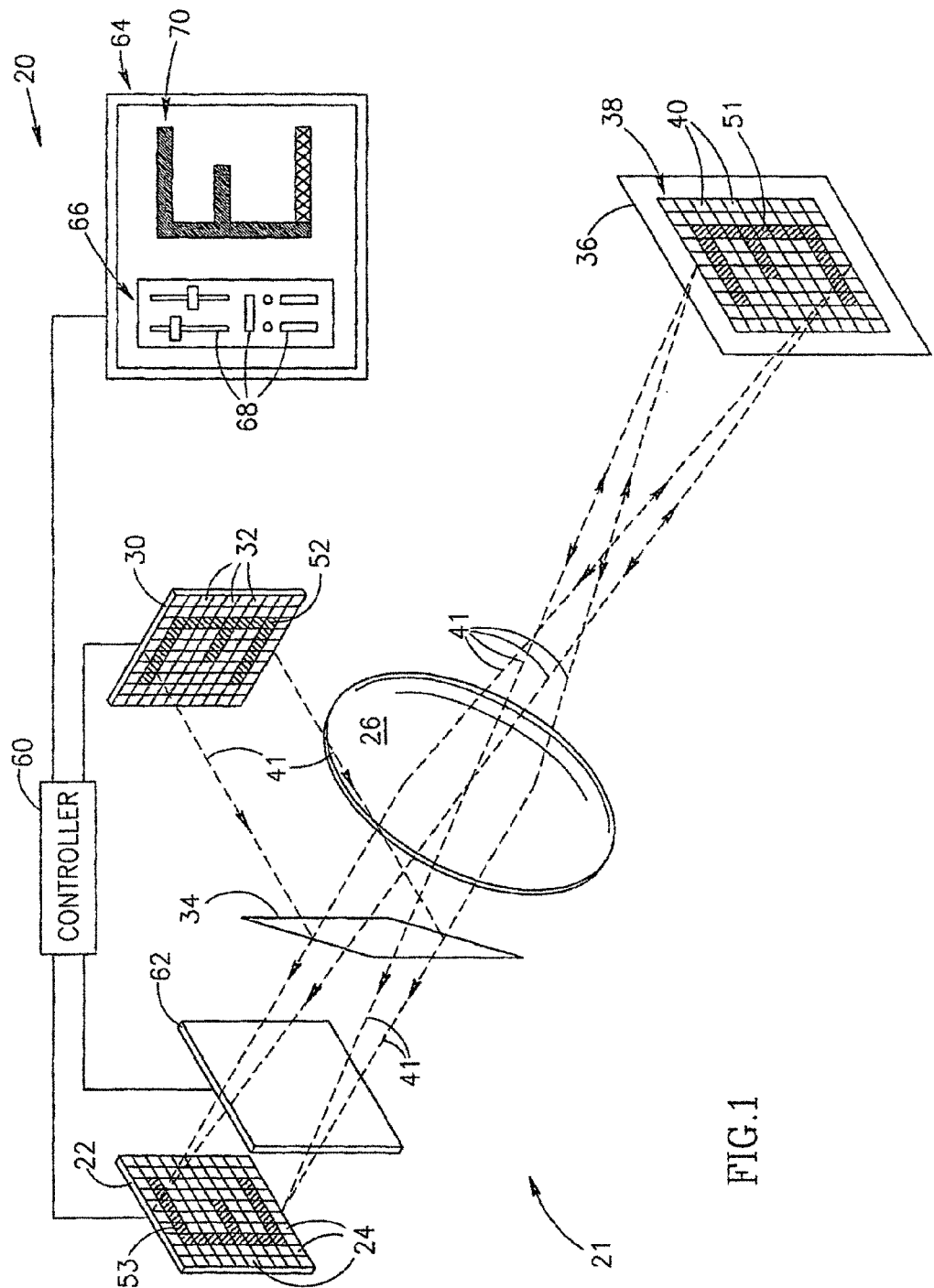
FIG. 1 schematically shows a camera comprising an illumination system having a pixelated illuminator boresighted with a photosurface of the camera, in accordance with an embodiment of the present invention.

FIG. 1 schematically shows a camera 20 comprising an illumination system 21, in accordance with an embodiment of the present invention.

Camera 20 comprises a photosurface 22, such as a CCD or CMOS light sensitive surface, having pixels 24 and optics represented by a lens 26 for focusing an image of a scene on photosurface 22. Whereas, in FIG. 1 (and in FIGS. 2 and 3 discussed below) a single lens 26 represents the optics, the optics may comprise any suitable optical system, which may have a plurality of lenses and optical elements, as known in the art, for focusing images on photosurface 22.

Illumination system 21 comprises a pixelated illuminator 30 having a plurality of light providing luxels 32. Pixelated illuminator 30 is boresighted with photosurface 22 using an appropriate beam splitter 34 and optical elements (not shown) as might be required, so that optimally, a virtual image of pixelated illuminator 30 is substantially coincident with photosurface 22. It is to be noted that because lens 26 is used both to focus an image of a scene being imaged with camera 20 on pixelated surface 22 and to focus light from pixelated illuminator 30 on the scene, that the virtual image of pixelated illuminator 30 remains automatically registered to photosurface 22 during zooming operations of the camera.

In general the size of pixelated illuminator 30 does not have to be the same as the size of photosurface 22. However, in order for a virtual image of pixelated illuminator 30 to be substantially coincident with photosurface 22, pixelated illuminator 30 or a real or virtual image of the pixelated illuminator that is boresighted with the photosurface must have a same size and shape as the photosurface. In FIG. 1 and figures that follow, for convenience of exposition, pixelated illuminator 30 is shown, by way of example, as having a same size as photosurface 22. Pixelated illuminator 30 is therefore shown boresighted with photosurface 22 without an optical system that provides an appropriate real or virtual image of the pixelated illuminator that has substantially a same size as photosurface 22. Pixelated illuminator 30 may be boresighted with photosurface 22 using methods similar to those described in U.S. patent application Ser. No. 09/250,322 referenced above.

By way of example, luxels 32, of pixelated illuminator 30, are assumed to have a size and shape so that a virtual image of each luxel 32 is substantially coincident with a single pixel 24 of photosurface 22. There is therefore (since a virtual image of pixelated illuminator 30 is substantially coincident with photosurface 22) a luxel 32 for each pixel 24 of photosurface 22.

A field of view of camera 20, at an object plane 36 of the camera located in a scene being imaged by the camera, is represented by a rectilinear mesh 38 comprising mesh squares 40. Mesh squares 40 are homologous with pixels 24 such that light that is collected by lens 26 that appears to come from any particular mesh square 40 is focused by the lens onto a single pixel 24 of photosurface 22 that corresponds to the particular mesh square. In exemplary embodiments of the invention, light provided by each luxel 32 is reflected by beam splitter 34 and illuminates substantially only, and all of, a single mesh square 40. The mesh square illuminated by the luxel 32 corresponds to the pixel 24 with which the virtual image of the luxel is coincident. Light from luxel 32 illuminates substantially only, and substantially all of, a single mesh square 40 as a result of the assumption, by way of example, that a virtual image of each luxel 32 is substantially coincident with a single pixel 24. In some embodiments of the present invention, size and shape of luxels 32 and position of pixelated illuminator 30 are such that light from adjacent luxels 32 overlap adjacent mesh squares 40. Illumination zones of the scene being imaged are those regions of the scene that can be illuminated by light from a single luxel 32. Boundaries of illumination zones of the scene are generally either coincident with or close to projections of boundaries of mesh squares 40 on the scene.

Dashed lines 41 in FIG. 1 represent selected light rays between corresponding points at peripheries of photosurface 22, pixelated illuminator 30 and field of view 38. Arrowheads on dashed lines represent direction of travel of light. For lines 41 that have arrows pointing in both directions along the lines, arrowheads pointing towards field of view 38 indicate direction of light from pixelated illuminator 30 that illuminates the field of view. Arrowheads pointing away from field of view 38 indicate light reflected from field of view 38 that is focused on photosurface 20.

To illustrate the relationship between luxels 32, pixels 24 in photosurface 22, mesh squares 40 and illumination zones of a scene being imaged by camera 20, assume that a letter "E" 51 represents the scene. Assume that letter 51 is coplanar with object plane 36 and located within field of view 38. (Letter 51 has a proper orientation as seen from camera 20 and appears reversed because, from the perspective of the reader, it is seen from the back.)

In FIG. 1, because letter 51 is coplanar with object plane 36, and virtual images of luxels 32 are coincident with pixels 24, illumination zones of letter 51 are coincident with mesh squares 40 and adjacent illumination zones of letter 51 are contiguous and do not overlap. If letter 51 were not planar and parallel to object plane 36, the illumination zones of letter 51 would not of course be squares but would be defined by generally curvilinear boundaries determined by the shape of the surface of letter 51 (and the shape of luxels 32). If letter 51 were displaced away from object plane 36 in a direction perpendicular to object plane 36, adjacent illumination zones would overlap along their mutual borders, with the amount of overlap varying with the displacement. For example if the displacement of letter 51 were rectilinear and did not comprise a rotation, the overlap would increase linearly with magnitude of the displacement.

In FIG. 1, the widths of the vertical "back" and horizontal "arms" of letter 51 are shown as having a width equal to a side of a mesh square 40 for convenience of presentation. The back and arms of letter 51 can of course be many mesh squares 40 wide and/or the widths can be equal to a fractional number of mesh squares or it can be offset from edges of the mesh squares. Luxels 32 in pixelated illuminator 30 that illuminate illumination zones of letter 51 are shaded. The shaded luxels 32 form an illumination pattern "E" 52, inverted top to bottom and reversed left to right, which corresponds to letter 51 in field of view 38. Similarly, shaded pixels 24 in photosurface 22 indicate pixels 24 on which letter 51 in field of view 38 is imaged by camera 20, and form an image letter "E", 53 on the photosurface. Letter 53 in photosurface 22 is a reflection, in beam splitter 34, of letter 52 in pixelated illuminator 30.

Light from each shaded luxel 32 in letter 52 illuminates a single corresponding illumination zone 40 of letter 51 in field of view of 38. (For convenience, since illumination zones of letter 51 are coincident with mesh squares 40 the illumination zones are referred to by the numeral 40 which identifies mesh squares 40.) For example, light provided by the luxel 32 at the tip of the short middle arm of letter 52 on pixelated illuminator 30 illuminates only that illumination zone 40 located at the tip of the short middle arm in letter 51.

In accordance with some embodiments of the present invention, luxels 32 are controllable to provide desired patterns of illumination for a scene that is imaged with camera 20. In some embodiments of the present invention, luxels 32 are "color" luxels, for which light intensity as well as a spectrum of light provided by the pixels can be controlled to provide different color light. For example, in some embodiments of the present invention, luxels 32 are RGB luxels controllable to provide different combinations of R, G and B light so as to control hue, saturation and intensity of light illuminating illumination zones of the scene. In some embodiments of the present invention, luxels 32 are "gray level" luxels that provide light having a fixed spectrum and for which only intensity of light provided by the pixels is varied. In some embodiments of the present invention light provided by luxels 32 is not limited to the visible spectrum but may, for example, comprise infrared or ultraviolet light.

Luxels 32 may provide and control light by emission, reflection or transmission, or a combination of these processes. For example, luxels 32 may comprise one or a combination of light sources, such as for example semiconductor lasers, that provide light by emission, micro-mirrors that provide light by reflection and/or liquid crystal cells that provide light by transmission. In some embodiments of the invention, the luxels may provide a multi-level controlled illumination.

Illumination system 21 may comprise a controller 60 for controlling luxels 32 and a shutter 62 for shuttering photosurface 22. Controller 60 shutters light provided by pixelated illuminator 30 so as to provide at least one light pulse to illuminate a scene being imaged with camera 20. In some embodiments of the present invention controller 60 shutters light from pixelated illuminator 30 by turning on and turning off luxels of luxels 32. In some embodiments of the present invention, camera 20 comprises a shutter, which is controlled by controller 60, to transmit and not transmit light in order to shutter light from pixelated illuminator 30, and provide at least one light pulse that illuminates a scene imaged by the camera. The shutter may, for example, be located between pixelated illuminator 30 and beam splitter 34. If pixelated illuminator 30 is an illuminator that provides light to illuminate a scene by reflecting light from a light source, such as the illuminator shown in FIG. 2, the shutter may be located between the light source and the illuminator.

Optionally, controller 60 controls shutter 62 so that during a time that luxels of luxels 32 are "on" to provide a pulse of light, shutter 62 does not transmit light. This reduces exposure of photosurface 22 to light from pixelated illuminator 30 that may reach photosurface 22 without being reflected from a scene being imaged by camera 20, as a result for example of reflections or "haloing" of light from the illuminator by internal structures of camera 20.

The intensity of the light may be varied in one or more of the following ways:

(1) The number of pulses emitted from each of the luxels may be varied. Thus, for example, if 256 levels of illumination are desired, 256 pulsed of light should be available for each frame (image) and the light level for each luxel adjusted by varying the number of pulses.

(2) A spatial attenuator, having a controllable number of attenuation levels is used to adjust the illumination level.

(3) The length of light pulses is adjusted.

(4) The intensity of the light pulses is adjusted, as for example, by adjusting the current to laser luxel sources.

Other methods of varying intensity may be used.

In some embodiments of the present invention, shutter 62 is gated open for a limited accurately determined "gate" period of time, during which shutter 62 transmits light, following an accurately determined delay from the time that each light pulse of the at least one light is radiated. Light pulse width, repetition rate, gate width and relative timing of gates and light pulses, hereinafter collectively referred to as "illumination range parameters", are determined so that light from the light pulse that reaches photosurface 22 is reflected only by objects in a limited desired range of distances from camera 20. The range of distances defines a scene having a desired depth of field and distance (i.e. range) from the camera.

Various methods known in the art may be used in the practice of the present invention to determine illumination range parameters appropriate to desired range and depth of field for a scene to be imaged by camera 20. Relationships between range parameters and range and depth of field of a scene are described in PCT Publications WO97/01111, WO97/01112, and WO97/01113 referenced above.

Whereas in some embodiments of the present invention, range parameters are determined and the determined range parameters define a range and depth of field for a scene, In some embodiments of the present invention, distance to a scene is determined and range parameters are determined responsive to the distance. The distance may be determined, for example, using devices and methods for determining range by focus or determining range by any of various time of flight techniques, techniques used in gated 3D cameras or geometrical techniques. Techniques for determining distances to regions in a scene are described in PCT applications PCT/IL98/00476 and PCT/IL98/00611 the disclosures of which are incorporated herein by reference. Gated 3D cameras and associated techniques are described in PCT Publications WO 97/01111, WO 97/01112, WO 97/01113 and U.S. patent application Ser. No. 09/250,322. Cameras using substantially "geometrical" methods for measuring distances to regions in a scene are described in PCT application PCT/IL97/00370, the disclosure of which is incorporated herein by reference.

In some embodiments of the present invention, camera 20 is a 3D camera and illumination parameters are determined to provide a 3D map of an imaged scene. The parameters may be determined using methods and described in PCT Publications WO 97/01111, WO 97/01112, WO 97/01113.

It should be noted that whereas in camera 20 photosurface 22 is shuttered by shutter 62, in some embodiments of the present invention, photosurface 22 is a "self shuttering" photosurface for which shuttering of the photosurface is accomplished by controlling circuits comprised in the photosurface. PCT publication WO 00/19705, the disclosure of which is incorporated herein by reference, describes self-shuttering photosurfaces in which each pixel in the photosurface comprises a circuit controllable to gate the pixel on or off.

Just as different luxels 32 may, in accordance with embodiments of the present invention, provide light characterized by different spectral distributions, pixels 24 in photosurface 22 may have different types of spectral sensitivities. For example, in some embodiments of the present invention photosurface 22 is a gray level "colorblind" photosurface. All pixels 24 in the photosurface are gray level pixels that are sensitive to substantially only total intensity of light, in a same limited spectrum, incident on the pixels. In some embodiments of the present invention photosurface 22 is a "color photosurface" 22, that provides a color image of a scene imaged by camera 20 and pixels 24 are color sensitive pixels, such as RGB pixels. In some embodiments of the present invention, pixels 24 are sensitive to infrared or ultraviolet light.

To illustrate some lighting effects that can be provided by an illumination system in accordance with an embodiment of the present invention, assume, by way of example, that pixelated illuminator 30 is an RGB color illuminator and that photosurface 22 is an RGB color photosurface. Assume further that the surface of letter 51 that is imaged by camera 20 is white and that the letter is set against a black background. By changing color of light provided by luxels 32 of pixelated illuminator 30, color of an image of letter 51, i.e. letter 53 formed on photosurface 22, provided by camera 20 can be changed. For example, if luxels 32 in illumination pattern 52 illuminate letter 51 with one of R, G or B light, image 53 on photosurface 22 will be respectively red green or blue. It is of course also possible, in accordance with an embodiment of the present invention, for camera 20 to provide a "rainbow" colored image of letter 51 by controlling different luxels on pixelated illuminator 30 to provide light of different hues.

Light from luxels 32 can also be controlled to compensate for variations in reflectivity between different surface regions of letter 51. For example, assume that surface regions of the middle arm of letter 51 are faded and are characterized by relatively low reflectivity compared to other surface regions of letter 51. If intensity of illumination of the surface of letter 51 is substantially uniform, the middle short arm in an image of letter 51 provided by camera 20 will appear faded. To compensate, in accordance with an embodiment of the present invention, for the fading, intensity of light provided by luxels 32 in the middle arm of illumination pattern 52 (i.e. "E" 52) is increased relative to intensity of light provided by the other luxels 32 in illumination pattern 52.

"Extreme" lighting effects can also be provided by an illumination system in accordance with an embodiment of the present invention. For example, if luxels 32 in the middle and lower arms of illumination pattern 52 are turned off so that they do not provide any light, only the back and bottom arm of letter 51 will be illuminated and an image of letter 51 will appear to be an "L".

The above example of a scene comprising only an "E" is of course a very simplified scene, which is provided to facilitate clarity of exposition. Substantially more complicated and intricate scenes can of course be imaged with camera 20 and illumination system 21 can be used to provide substantially more subtle and complicated lighting effects than the lighting effects described above.

For example, assume that a portrait of a young woman wearing large highly reflective gold earrings is being imaged with camera 20 and that the woman's face is surrounded by an arrangement of brightly colored flowers. If the woman's face is relatively pale, controller 60 can control light provided by pixelated illuminator 30 to "tint" her face so that it appears more vital. If the earrings appear too bright, controller 60 can control luxels 32 in pixelated illuminator 30 to decrease intensity of illumination of the earrings.

It is therefore seen that an illumination system, in accordance with an embodiment of the present invention, can control illumination of a scene being imaged by a camera so as to control both color and contrast of the image.

Optionally, camera 20 comprises a visual display screen 64 that a person using the camera 20 employs to transmit information to and receive information from controller 60. When a scene is being imaged by camera 20, controller 60 may, for example, display a preview of the scene on screen 64. In some embodiments of the present invention, controller 60 also displays a control panel 66 having appropriate control buttons 68, such as toggle and slide buttons, and or a keyboard (not shown) for communicating instructions to controller 60. In some embodiments of the invention, the user can indicate a region of the scene for which the user wishes to adjust illumination by selecting the region in the preview. Various methods known in the art may be used for selecting the region. For example, the user can touch the region with a finger or draw a contour around the region using a stylus. In some embodiments of the present invention camera 20 comprises a mouse that can be used to draw a suitable border around a region to be selected or to point to an object for which object a region is automatically delineated using image processing methods well known in the art. Once a region is selected, the user indicates desired changes of illumination for the region by pressing or sliding appropriate control buttons shown on screen 66.

In FIG. 1 screen 64 shows a preview letter E, 70 of letter 51 as it will be imaged by camera 20 under illumination conditions that obtain at the time that preview 70 is shown. By way of example, in preview 70, the bottom arm of the letter is faded, which is indicated by lighter shading of the bottom arm of "preview E" 70 in comparison to shading of other regions of the preview E. To improve an image of letter 51 provided by camera 20, the user selects the bottom arm of preview letter 70. In some embodiments of the present invention, the user then instructs controller 60 to increase illumination of the region of letter 51 corresponding to the selected region of preview 70 by moving an appropriate slider displayed in control panel 66 by a desired amount. Controller 60 controls luxels 32 corresponding to the selected region responsive to the amount by which the user moved the slider and displays an adjusted preview of letter 51 on the output screen. If the user determines, responsive to the adjusted preview, that illumination of letter 51 requires further adjustment, the user again selects a region of the letter in the preview to be adjusted and indicates a desired adjustment of the illumination using displayed control panel 66. If the user determines that further adjustment is not required, the user instructs camera 20 to image letter 51.

In some embodiments of the present invention, controller 60 receives signals from pixels 24 in photosurface 22 responsive to light that is incident on the pixels. In some embodiments of the present invention, controller 60 uses signals from pixels 24 to calibrate light output of luxels 32 that correspond to the pixels. The user controls camera 20 to image a suitable surface having uniform reflectivity that fills a field of view of camera 20. Controller 60 uses the signals to determine correspondence between control settings of luxels 32 and light output of the luxels.

In some embodiments of the invention, such measurement can also be used to determine overlap between luxels. For example, where individual pixels are selectively illuminated, the pixels are sequentially illuminated and the intensity on illumination acquired by the camera at adjacent pixels is determined. Similarly, when areas of the field of view are illuminated together, both edge fall-off and overlap can be determined in the same way. These measurements can be sued to correct certain of the results in some embodiments of the invention.

In some embodiments of the present invention controller 60 controls light provided by luxels 32 that correspond to the pixels, responsive to the signals. For example, assume that the user instructs controller 60 to increase brightness of a region of a scene being imaged by a desired amount. Controller 60 increases output intensity of the luxels until brightness of the region, as determined from signals from pixels 24, indicate that brightness of the region of the scene is of the desired magnitude.

In some embodiments of the present invention, controller 60 automatically adjusts illumination of a scene imaged by camera 20 responsive to a particular algorithm so as to provide a desired contrast of an imaged scene. For example, in accordance with an embodiment of the present invention, controller 60 may automatically reduce illumination of illumination zones in the scene corresponding to pixels 24 that generate signals indicating that intensity of light incident on the pixels is greater than a predetermined intensity. Similarly controller 60 can be programmed to increase illumination of illumination zones for which corresponding pixels 24 indicate that intensity of incident light is low.

In some embodiments of the present invention, controller 60 uses signals from pixels 24 to perform relatively more complicated processing of an image of a scene being imaged by camera 20. For example controller 60 may control illumination of the scene to provide smoothing of the image or sharpening of the image. In some embodiments of the present invention controller 60 uses signals from pixels 24 to determine parameters, such as for example mean brightness and/or brightness range, of a brightness histogram of the imaged scene. Controller 60 then adjusts illumination of the scene so that the parameters in the image of the scene assume desired values. In some embodiments of the present invention a "histogram adjustment", such as a histogramic equalization of the image or a region of the image, is performed by controller 60 for a single histogram of total integrated light intensity reaching pixels 24. In some embodiments of the present invention, controller 60 performs brightness histogram adjustments for each color light provided by pixelated illuminator 30. For example if pixelated illuminator provides RGB light, histogram adjustments are made for each of R, G and B light.

It is to be noted that camera 20, in accordance with an embodiment of the present invention, provides accurate determination of reflectance of regions in a scene being imaged by the camera and as a result high resolution processing of a scene being imaged by the camera.

An aspect of some embodiments of the invention is concerned with the acquisition of high gray level resolution images utilizing a camera having a lower gray level resolution. An exemplary method for acquiring such an image is shown in FIG. 4.

Figure 4:
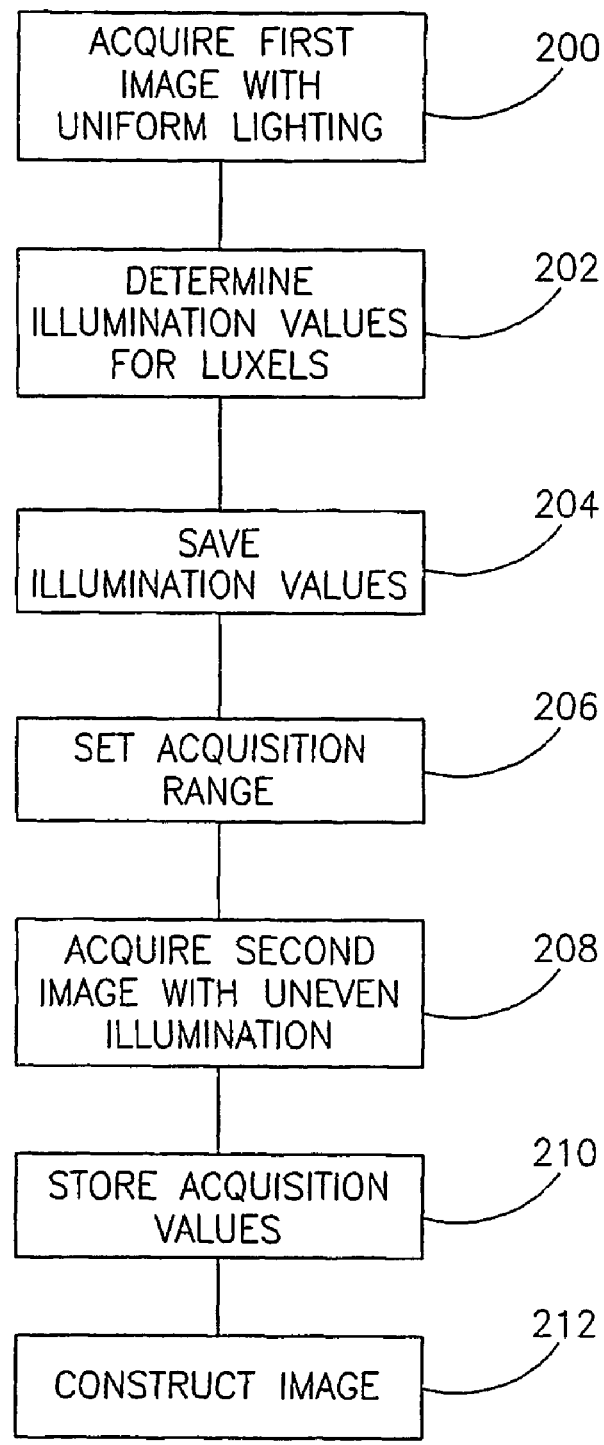
FIG. 4 is a flow chart of a method for providing a high gray level resolution image, in accordance with an exemplary embodiment of the invention.

In accordance with the embodiment outlined in FIG. 4, a first image with uniform lighting is first acquired (200). The brightness values in the image are used to determine illumination values for the pixels (202) such that the lighting differently illuminate the various regions of the field of view is adjusted to give a relatively flat (contrast-wise) image. These illumination values are stored (204). If the acquisition has a resolution of N gray levels (from zero to some maximum) the illumination may have up to N' illuminations spaced at intervals such that for each gray level there exists a combination of N and N' such that $N*N'=C$, where C is a constant that is the same for all of the pixels.

Under this flattening illumination, a second image is acquired (208). Ideally, the intensity variations in this image are less than ±0.5 of the intensity distance between the initial gray levels. In an exemplary embodiment of the invention, the acquisition range is set (206) to cover this range of gray levels with substantially the entire range of acquisition levels. The acquisition values are preferably stored (210).

If M acquisition levels and P illumination levels are available, each pixel (i, j) is characterized by two numbers $m_{ij}$ and $p_{ij}$. The gray levels of a uniformly illuminated image can thus (ideally) be derived to a resolution given by M×P gray levels.

In some embodiments of the invention, the illumination is controlled only over regions of greater than one pixel. In this case, the second image will have a variability that is larger than the variability when the illumination of the individual pixels are separately illuminated. In one exemplary embodiment, the field of view is divided into Q regions. An uniformly lit image is acquired. The acquired intensity over the regions is averaged and the illumination is adjusted such that the acquired intensity (for a subsequent image) over all of the regions (based on the averages) is uniform to within the quantization accuracies of the illumination and the acquisition. Again, each pixel is characterized by two numbers, one for the illumination and one for the acquisition.

The number of levels for illumination and acquisition need not be the same. Thus, for example, if there are half as many illumination levels as there are acquisition levels, the illumination levels are matched to every second acquisition level, such that the total range of illuminations for the second acquisition is ±1 original gray level. The second acquisition is set to cover this range with the entire range of acquisition values.

A very high resolution gray level (uniformly illuminated) image can be constructed (212) by generating an image in which each pixel has a brightness derived from the illumination level and the acquired brightness level. Thus, in a simple embodiment, the first P bits of the image gray level would be given by the illumination values and the next M bits of the image gray level would be given by the acquisition levels of the second acquired image. Conveniently, two matrices are provided, for example in a memory in controller 60, one of which contains information on the illumination and the other information on the second acquisition.

While a fixed A/D for the acquisition may be used, in some embodiments of the invention an A/D that allows for adjusting the zero level for the acquisition (so that the acquisition starts at the gray level of the pixel with the lowest illumination) and the A/D gain, so that the highest acquisition gray level is matched with the brightest portion of the image. An iris may be provided to at least partially adjust the gain. These methodologies, while they give higher gray level resolution result in higher The above discussion describes a system in which the illumination elements illuminate pixels or groups of pixels without overlap. In general, illumination of a pixel (for individual pixel illumination) or illumination of a region (for regional pixel illumination) will overlap at least partly into one or more neighboring pixels. In such cases, the reconstruction optionally takes into account the effects of illumination of adjacent pixels when determining the illumination to be used and in reconstructing the image. Optimally, for regional illumination, the overlap is adjusted such that, for uniform brightness of the sources, each pixel is uniformly illuminated. This can be achieved, for example, by providing for Gaussian roll off of the illumination, with the half illumination point at the edge of the portion being illuminated.

It should be understood that the method may be used for acquiring only a portion of a scene or for acquiring a scene in piecewise portions.

Figure 2:
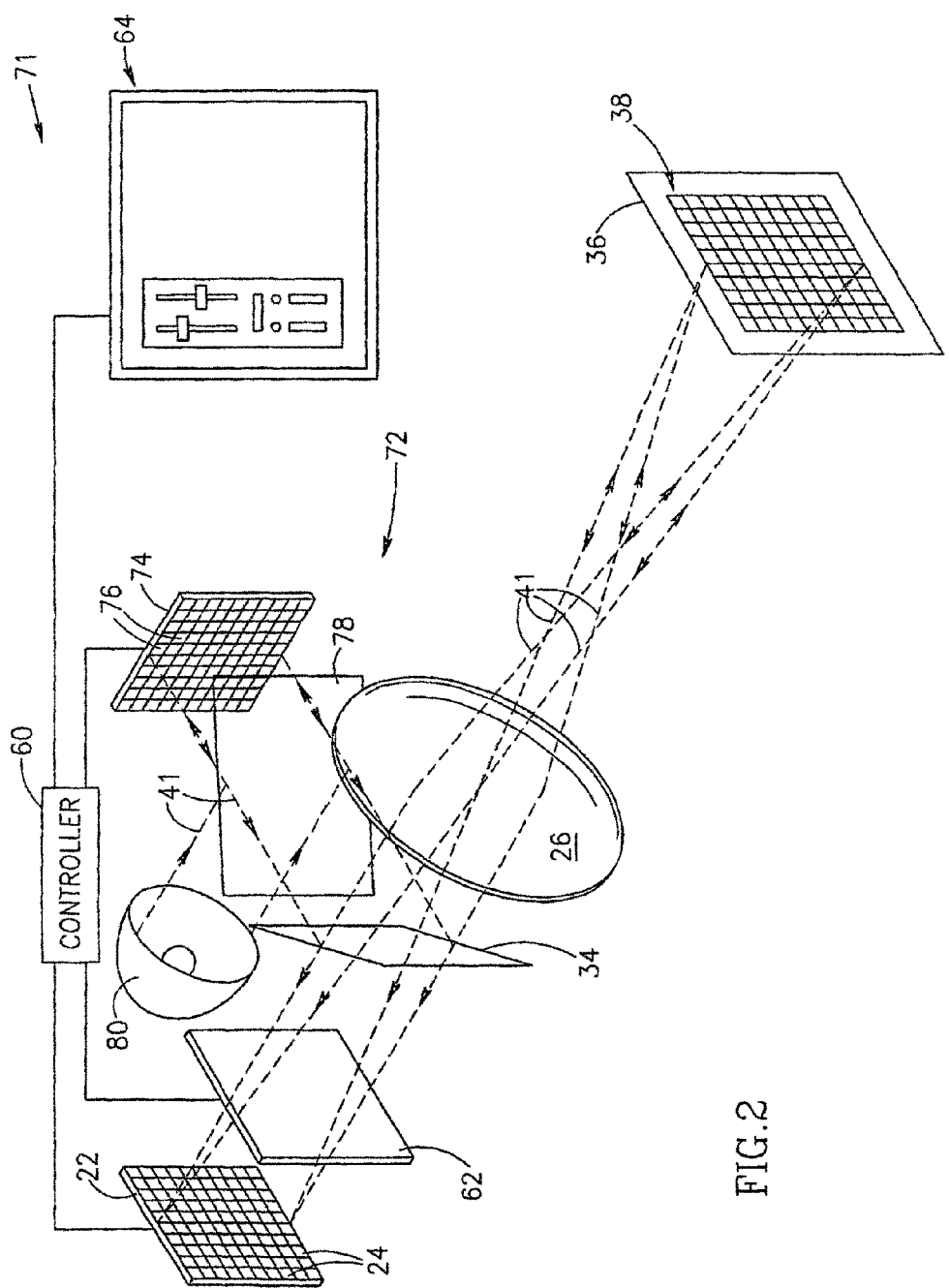
FIG. 2 schematically shows another camera comprising an illumination system having a light projector and a "boresighted" pixelated illuminator, in accordance with an embodiment of the present invention.

FIG. 2 schematically shows a camera 71 similar to camera 20 comprising an illumination system 72, in accordance with an embodiment of the present invention. Illumination system 72 comprises a pixelated illuminator 74 having luxels 76, a beam splitter 78 and a light source 80 that provides light that is incident on beam splitter 78. Whereas light source 80 is schematically shown, by way of example, as an incandescent lamp, light source 80 may comprise any suitable light source, such as for example a laser, an array of lasers, flash lamp, arc source and an integrating sphere. Light source 80 may also comprise optical elements required to collimate and/or direct light from the light source so that the light is appropriately incident on beam splitter 78. Beam splitter 78 reflects a portion of the light so that it is incident on pixelated illuminator 74. In FIG. 2 as in FIG. 1, dashed lines 41 and associated arrowheads indicate direction of travel of light along selected light rays.

In some embodiments of the present invention, each luxel 76 in pixelated illuminator 74 comprises a liquid crystal (LC) cell (not shown) having a front surface that faces beam splitter 78 and its own reflecting electrode (not shown) at a back surface of the cell. Light from light source 80 that enters a luxel 76 enters the LC cell of the luxel and is reflected back out the luxel by the electrode. Voltage applied to the luxel's electrode controls transmittance of the luxel's LC cell and therefore intensity of light that exits the luxel. Light that exits the luxel 76 is incident on beam splitter 78, which transmits some of the light to beam splitter 34. Beam splitter 34 in turn reflects a portion of the light to illuminate an illumination zone of a scene being imaged with camera 71 that corresponds to the luxel. Controller 60 controls voltages applied to the pixel electrodes of luxels 76 and controls thereby light from the luxels that illuminates a scene being imaged with camera 71.

In some embodiments of the present invention, light source 80 provides white light and each pixel electrode reflects substantially only R, G or B light. A luxel 76 of pixelated illuminator 74 therefore provides either R, G or B light. R, G and B luxels 76 may be grouped into groups of three luxels, each group comprising an R, G and B luxel and each such group corresponding to a single (color) pixel 24 in photosurface 22. (Assuming that each pixel 24 comprises an R, G and B photosensor, preferably, a configuration of the photosensors in the pixel is homologous with a configuration of the R, G and B luxels in the group of luxels corresponding to the pixel. In some embodiments of the present invention virtual images of R, G and B luxels are slightly defocused so that each luxel 76 in a group of luxels illuminates the appropriate photosensor in the corresponding pixel 24.) Three illumination zones, an R, G and B illumination zone, therefore correspond to each region of a scene imaged by a pixel 24. Controller 60 controls intensity, hue and saturation of illumination of the region by controlling intensity of light from each of the R, G and B luxels 76 that illuminate the illumination zones.

In some embodiments of the present invention, light source 80 provides R, G and B light, using for example a color wheel, and pixel electrodes of luxels 76 are "white" reflectors characterized by a substantially same reflectivity for R, G and B light. Each luxel 76 optionally corresponds to a single pixel 24 and a region of a scene imaged on the pixel 24 corresponds to the illumination zone of the scene illuminated by the luxel 76.

Controller 60 may control light source 80 to illuminate pixelated illuminator sequentially with R, G and B light. Controller 60 controls transmittance of the LC cells in luxels 76 in synchrony with R, G and B light from light source 80 to control hue, saturation and intensity of illumination of illumination zones in the imaged scene.

In some embodiments of the present invention pixelated illuminator is a DMD device and each luxel 76 comprises a micromirror (not shown). Controller 60 controls the micromirrors, using methods known in the art, to control intensity of light from light source 80 that is provided by each pixel 76.

Figure 3:
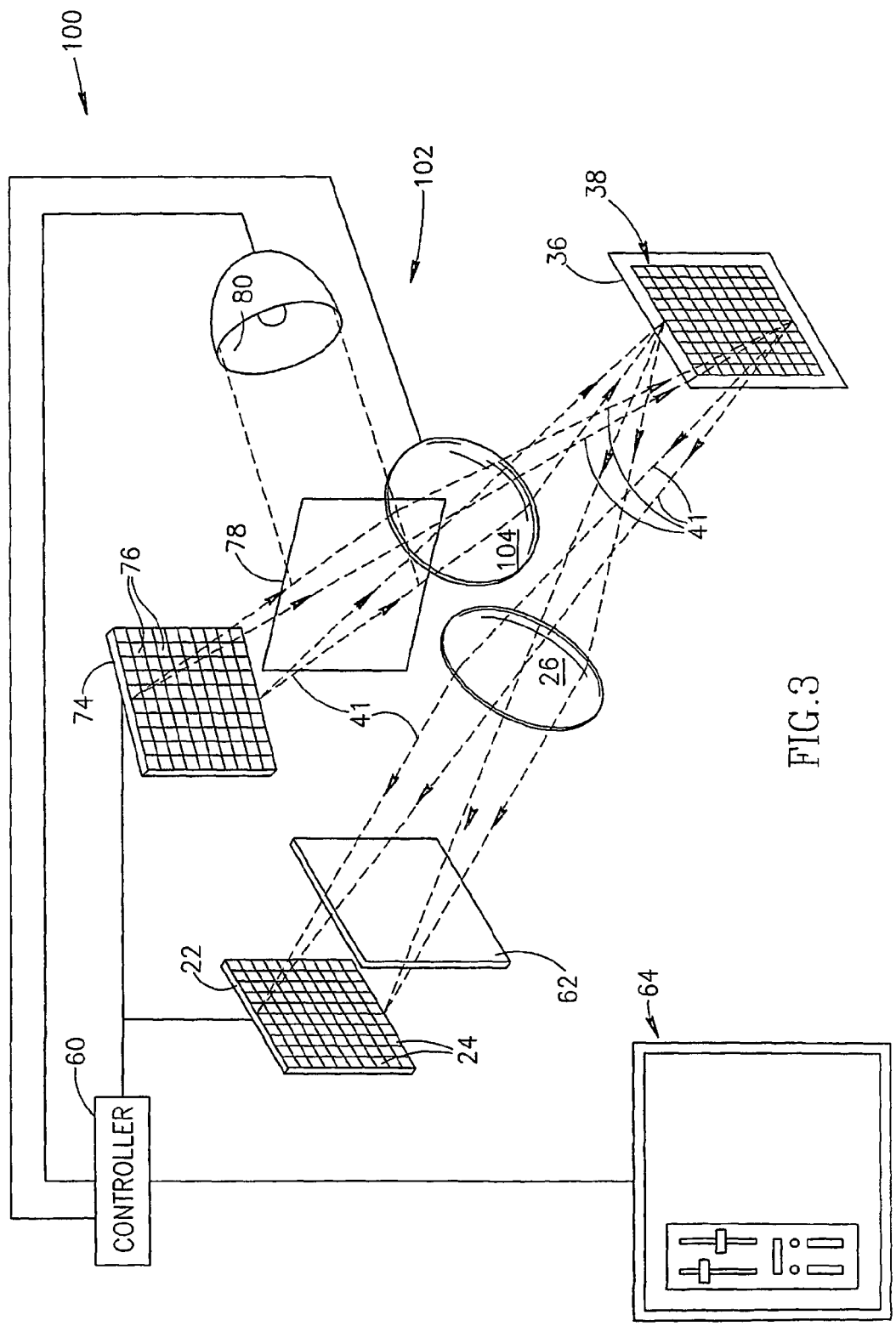
FIG. 3 schematically shows a camera comprising an illumination system in which a pixelated illuminator of the illumination system is not boresighted with a photosurface of the camera, in accordance with an embodiment of the present invention.

FIG. 3 schematically shows a camera 100 having a photosurface 22 and comprising an illumination system 102 having a pixelated illuminator 74 comprising luxels 76, a light source 80 and a beam splitter 78, in accordance with an embodiment of the present invention. Light from a scene imaged by camera 100 is focused by optics represented by a lens 26 onto photosurface 22. A field of view 38 of camera 100 in an object plane 36 of the camera is located at an appropriate position in the scene. Pixelated illuminator 74 is not boresighted with photosurface 22 and illumination system 102 comprises optics, represented by a lens 104, that focuses light from luxels 74 onto a scene imaged by camera 102. In FIG. 3, as in FIGS. 1 and 2, dashed lines 41 and associated arrowheads indicate direction of travel of light along selected light rays.

As in illumination system 72 shown in FIG. 2, light from light source 80 is directed to pixelated illuminator 74 by beam splitter 78. Each of luxels 76 reflects a controlled amount of light incident on the luxel from light source 80 towards optics 104. Optics 104 focuses the light from the luxel to an illumination zone in field of view 38. Optimally optics 104 forms an image of pixelated illuminator 74 at object plane 36 which is substantially coincident with field of view 38.

In some embodiments of the present invention, illumination system 104 comprises a controller 60 that controls illumination system optics 104. Controller 60 adjusts optics 104 so that as camera 100 images scenes at different distances from the camera and distance of field of view 38 from the camera changes, light from pixelated illuminator 74 is appropriately focused to the field of view.

Except for pixelated illuminator 74 not being boresighted with photosurface 22 and features of illumination system 102 resulting therefrom, illumination system 102 is similar to and functions similarly to illumination systems 21 and 72. Variations of illumination system 102, in accordance with embodiments of the present invention, can be used to provide gray level and/or color illumination of a scene imaged by camera 100 and/or perform any of the illumination adjustments described with respect to illumination systems 21 and 72 and variations thereof. Similarly, whereas illumination system 102 is shown comprising light source 80 and a "reflecting type" pixelated illuminator, other types of non-boresighted illumination systems, in accordance with an embodiment of the present invention, are possible and can be advantageous. For example, a non-boresighted illumination system, in accordance with an embodiment of the present invention, may be without a light source 80 and comprise a pixelated illuminator that emits light instead of one that reflects light. Any of the boresighted illumination systems and variations thereof described above can, in accordance with an embodiment of the present invention, be configured as a non-boresighted illumination system. As in illumination systems 21 and 72, illumination system 102 is shown, by way of example comprising a visual display 64 for communicating with a user.

In some embodiments of the present invention, controller 60 controls pixel illuminator 74 to illuminate an imaged scene with a particular spatial and/or temporal "calibration" pattern of light. Controller 60 correlates response of pixels 24 in photosurface 22 with the calibration light pattern to determine alignment of pixelated illuminator 74 relative to photosurface 22 and determine which pixels 24 in photosurface 22 image each of the illumination zones of a scene illuminated by the illumination system.

By way of example, controller 60 may turn on and turn off a pattern of luxels 76 in pixelated illuminator 74 so that the pixels in the pattern "flicker" and illuminate illumination zones of a scene imaged by camera 100 with flickering light. Controller 60 determines which pixels 24 in photosurface 22 generate signals indicating that light incident on the pixels is flickering in cadence with the turning on and turning off of luxels 76 in the pattern. Controller 60 associates "flickering" photosurface pixels 24 with their corresponding luxels 76 and illumination zones in the scene. By determining which flickering luxels 76 correspond to which "flickering" photosurface pixels 24, controller 60 determines alignment of pixelated illuminator 76 relative to photosurface 22 and generates a "map" of which pixels in photosurface 22 image each of the illumination zones of a scene illuminated by the illumination system. Controller 60 uses the map to determine which luxels 76 to control to provide desired lighting of the scene.

It is to be noted that whereas calibration of an illumination system and "mapping" of luxels and photosurface pixels is described for non-boresighted illumination system 102 calibration and mapping, in accordance with an embodiment of the present invention, may be similarly performed by boresighted illumination systems.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A camera comprising:
   a photosurface comprising light sensitive pixels that generate signals responsive to light incident thereon and optics that focus an image of a scene onto the photosurface; and
   an illumination system for illuminating the scene with light that is reflected from the scene and imaged on the photosurface by the optics, the illumination system comprising:

an illuminator having a plurality of substantially contiguous, independently controllable light providing regions;

optics that focuses an image of the illuminator on the scene so that light from the illuminator illuminates substantially all of and substantially only the field of view of the camera; and a controller capable of controlling the light providing regions to adjust lighting to the scene responsive to each of a plurality of selectable lighting adjustment procedures, wherein the controller adjusts the distribution of light responsive to an image acquired by the camera.

2. A camera according to claim 1 wherein each light providing region is controllable to provide one or more of R, G or B light.

3. A camera according to claim 2 wherein responsive to a lighting adjustment procedure the controller controls intensity of R, G or B light provided by each light providing region so as to control hue, saturation or intensity of light illuminating a region of the scene independently of hue saturation and intensity of light illuminating other regions of the scene.

4. A camera according to claim 2 wherein responsive to a lighting adjustment procedure the controller controls light provided by at least one light providing region to control an intensity distribution of R, G or B light reflected by the scene that is incident on pixels of the photosurface.

5. A camera according to claim 1 wherein each light providing region is controllable to provide white light.

6. A camera according to claim 1 wherein the illuminator is boresighted with the photosurface so that a virtual image of the illuminator is located at the photosurface and optics that image the scene on the photosurface image the illuminator on the scene.

7. A camera according to claim 6 wherein a virtual image of the illuminator is substantially coincident with the photosurface.

8. A camera according to claim 1 wherein light from each of the light providing regions that is reflected from the scene is imaged on a different group of contiguous pixels in the photosurface.

9. A camera according to claim 1 wherein light from each of the light providing regions that is reflected from the scene and imaged by the camera is imaged on a region of the photosurface having a size substantially equal to the size of a pixel in the photosurface.

10. A camera according to claim 9 wherein the region on which the light is imaged is located substantially within the area of a pixel on the photosurface.

11. A camera according to claim 1 wherein the regions of the photosurface on which light from at least two adjacent light providing regions of the illuminator is imaged overlap.

12. A camera according to claim 1 wherein there is substantially little overlap of regions of the photosurface on which light from adjacent light providing regions of the illuminator is imaged.

13. A camera according to claim 1 wherein light from a plurality of the light providing regions that is reflected from the scene and imaged by the camera is imaged on a same region of the photosurface having a size substantially equal to the size of a pixel in the photosurface.

14. A camera according to claim 13 wherein the region on which the light from the plurality of light providing regions is imaged is located substantially within the area of a pixel on the photosurface.

15. A camera according to claim 1 wherein responsive to a lighting adjustment procedure the controller controls intensity of light provided by each light providing region so as to control intensity of light illuminating a region of the scene illuminated by light from the light providing region independently of intensity of light illuminating other regions of the scene.

16. A camera according to claim 1 wherein responsive to a lighting adjustment procedure the controller controls light provided by at least one light providing region to control an intensity distribution of light reflected by the scene that is incident on pixels of the photosurface.

17. A camera according to claim 1 wherein the controller receives signals generated by each pixel responsive to light incident on the pixel and controls light provided by at least one of the light providing regions responsive to the signals to adjust illumination of the scene.

18. A camera according to claim 17 wherein responsive to a lighting adjustment procedure the controller controls light provided by at least one light providing region to decrease intensity of light reaching the camera from a region of the scene for which intensity of light incident on a pixel that images the region is greater than a predetermined maximum intensity.

19. A camera according to claim 17 wherein responsive to a lighting adjustment procedure the controller controls light provided by at least one light providing region to increase intensity of light reaching the camera from a region of the scene for which intensity of light incident on a pixel that images the region is less than a predetermined minimum intensity.

20. A camera according to claim 1 wherein the camera comprises a user operated input terminal to transmit instructions to the controller and wherein the controller controls light from at least one of the light providing regions responsive to the instructions to adjust illumination of the scene.

21. A camera according to claim 20 wherein the input terminal comprises a display screen.

22. A camera according to claim 21 wherein the controller generates a preview of an image of the scene being imaged by the camera on the screen responsive to signals that it receives from the pixels.

23. A camera according to claim 22 and comprising a selector controllable to select an object or region in the preview.

24. A camera according to claim 23 wherein the controller controls light provided by light providing regions responsive to the selected region or object.

25. A camera according to claim 21 wherein the controller displays a control panel having control icons on the screen and wherein manipulation of the control icons transmits instructions to the controller.

26. A camera according to claim 1 and comprising a shutter that the controller opens and closes to gate the photosurface on and off.

27. A camera according to claim 26 wherein the controller shutters light from light providing regions so as to radiate at least one pulse of light having a pulse width that illuminates the scene.

28. A camera according to claim 27 wherein the controller gates the photosurface on and off at times responsive to a time at which the at least one light pulse is radiated.

29. A camera according to claim 28 wherein the controller determines a distance to a region of the scene responsive to light reaching a pixel that images the region during a time at which the photosurface is gated on.

30. Apparatus according to claim 1 wherein the controller is capable of controlling the light intensity of light from the light providing regions to provide lighting of the scene which gives a reduced range of intensities of light entering the camera from the scene.

31. A camera comprising:
a photosurface comprising light sensitive pixels that generate signals responsive to light incident thereon and optics that focus an image of a scene onto the photosurface; and
an illumination system for illuminating the scene, the illumination system comprising:
an illuminator having a plurality of substantially contiguous, independently controllable light providing regions;
optics that focuses an image of the illuminator on the scene so that light from the illuminator illuminates substantially all of and substantially only the field of view of the camera;
a shutter controllable to gate the photosurface on and off; and
a controller that shutters light from light providing regions so as to radiate at least one pulse of light having a pulse width that illuminates the scene and controls each light providing region so as to minimize a difference between an amount of light reaching different pixels in the photosurface from the at least one light pulse.

32. A camera according to claim 31 wherein the controller gates the photosurface on and off at times responsive to a time at which the at least one light pulse is radiated.

33. A camera according to claim 32 wherein the controller gates the photosurface off when the illumination system is providing light to illuminate the scene.

34. A camera according to claim 32 wherein the controller determines a distance to a region of the scene responsive to light reaching a pixel that images the region during a time at which the photosurface is gated on.

35. A camera according to claim 31 wherein the at least one light pulse comprises a train of light pulses.

36. A camera according to claim 31 wherein the controller controls light provided by the light providing regions so as to minimize a difference between a predetermined light intensity and intensity of light reaching each pixel in the photosurface from the scene.

37. A camera according to any of claim 31 wherein the controller:
controls the light providing regions to illuminate the scene with substantially uniform illumination;
acquires a first image of the scene under uniform illumination;
determines intensities of light provided by light providing regions for the uniform illumination that minimizes the difference between the light reaching different pixels;
controls the light providing regions to illuminate the scene with a second illumination responsive to the determined intensities;
acquires a second image of the scene under said second illumination;
determines an amount of light reaching each pixel in the second image; and
determines brightness values for a region of the scene responsive to intensity values of said second illumination and amounts of light reaching pixels in said second image.

38. A camera according to claim 37 wherein the controller controls the camera to acquire the second image using a brightness acquisition range limited to the range of brightness values in the image.

39. Apparatus according to claim 31 wherein the controller adjusts the distribution of light responsive to an image acquired by the camera.

40. A method for illuminating a scene being imaged by a camera, the camera comprising a photosurface having pixels and optics for imaging the scene on the photosurface, the method comprising:
illuminating the scene with an illuminator comprising a plurality of light providers so that each region of the scene that is imaged on a region of the photosurface comprising at least one pixel but less than all the pixels of the photosurface is illuminated with light provided by at least one light provider that provides light substantially only for the region; providing a controller capable of controlling the light providers to adjust lighting to the scene responsive to each of a plurality of selectable lighting adjustment procedures and to an image acquired by the camera;
selecting a procedure from the plurality of lighting adjustment procedures responsive to which selected procedure the controller controls the at least one light provider for a region of the scene to adjust illumination of the scene.

41. A method according to claim 40 wherein each light provider is controllable to provide R, G or B light.

42. A method according to claim 40 wherein controlling light providers to adjust lighting responsive to a lighting adjustment procedure comprises controlling the light providers so as to perform a predetermined image processing procedure.

43. A method according to claim 42 wherein the image processing procedure comprises unsharp masking.

44. A method according to claim 42 wherein the image processing procedure comprises sharpening.

45. A method according to claim 42 wherein the image processing procedure comprises smoothing.

46. A method according to claim 42 wherein the image processing procedure comprises histogramic equalization.

47. A method according to claim 40 wherein the light providers are independently controllable and wherein controlling each of the light providing regions comprises controlling each of the light providing regions independently of the other light providing regions.

48. A method according to claim 40 wherein controlling the light providers comprises controlling the light providers to control contrast in an image of the scene provided by the camera.

49. A method according to claim 48 wherein controlling contrast comprises controlling contrast in only a localized region of the image.

50. A method according to claim 40 wherein controlling light providers comprises controlling the light providers to adjust an intensity distribution of light from the scene that is incident on pixels in the photosurface.

51. A method according to claim 50 wherein adjusting an intensity distribution comprises controlling a parameter of the intensity distribution.

52. A method according to claim 40 wherein the at least one pixel is a single pixel.

53. A method according to claim 40 and comprising boresighting the illuminator so that a virtual image of the illuminator is located substantially at the photosurface.

54. A method according to claim 53 wherein the virtual image of the illuminator is substantially coincident with the photosurface.

55. A method according to claim 54 wherein a virtual image of each light provider is located within a different group of contiguous pixels on the photosurface.

56. A method according to claim 54 wherein a virtual image of each light provider is located substantially within a corresponding single pixel.

57. A method according to claim 54 wherein a virtual image of a plurality of light providers is located substantially within a corresponding single pixel.

58. A method of imaging, comprising:
   illuminating at least a portion of a scene with substantially uniform lighting;
   determining a spatially varying illumination that reduces the variability of brightness values of the at least portion of the scene;
   illuminating the at least portion with said varying illumination;
   acquiring a second image of the at least portion, said second image having brightness values for areas thereof; and
   determining the brightness values of the scene under uniform illumination from the brightness values and the varying values of the illumination.

59. A method according to claim 58 wherein acquiring the second image comprises acquiring the images using a brightness acquisition range limited to the range of brightness values in the image.

60. A camera comprising:
   a photosurface responsive to light incident thereon and optics that focus an image of a scene onto the photosurface; and
   an illumination system that illuminates the scene with light that is reflected from the scene and imaged on the photosurface by the optics, the illumination system comprising:
      an illuminator having a plurality of substantially contiguous, independently controllable light providing regions;
      optics that focuses an image of the illuminator on the scene so that light from the illuminator illuminates the field of view of the camera; and
   a controller capable of controlling the light providing regions to adjust lighting to the scene responsive to an image acquired by the camera.

* * * * *